Patented July 2, 1940

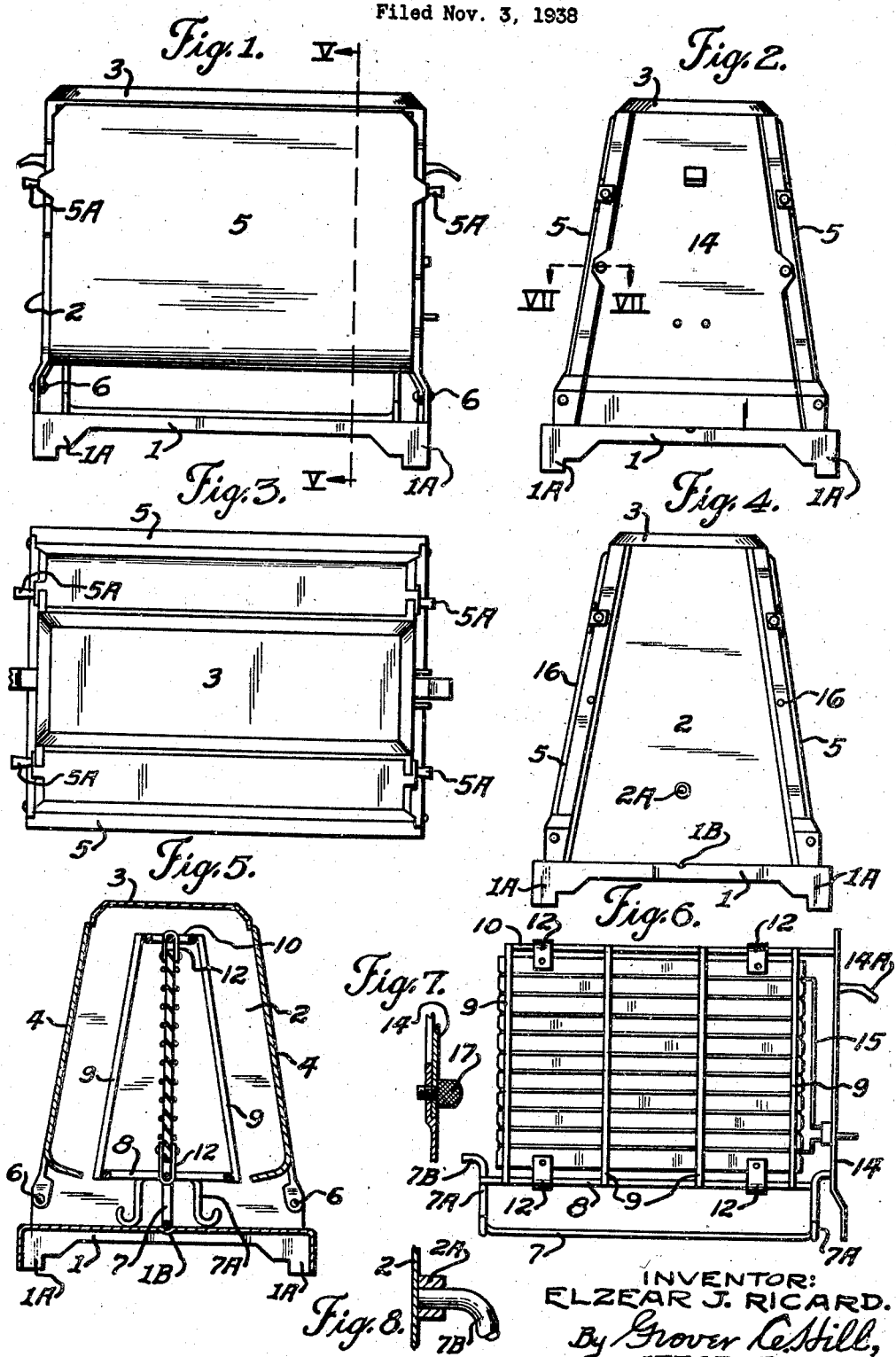

2,206,675

UNITED STATES PATENT OFFICE 2,206,675

ELECTRIC TOASTER WITH REMOVABLE HEATING ELEMENT

Elzear J. Ricard, Detroit, Mich., assignor of fifteen per cent to Fred C. Juergens, Detroit, Mich.

Application November 3, 1938, Serial No. 238,502

1 Claim. (Cl. 219—19)

One advantage of this invention is to extend the improvements set forth in an application filed by me November 3, 1938, Serial Number 238,501.

It is a well known fact that electricity is applied to various household appliances rendering them decidedly more advantageous in every respect, and one of the most important of these appliances is the electric toaster, although the chief objection to the present type of toasters is the fact that they can not be cleaned of falling bread crumbs in a satisfactory manner, and to my knowledge no effort has heretofore been made so as to correct this objectionable feature although the need has always been apparent since the introduction of this type of toaster.

The outstanding advantage of the invention is to provide a heating element unit that may be quickly and easily removed from the framework of the toaster thereby rendering the same readily susceptible to being thoroughly cleaned of bread crumbs and the like and likewise reinserting the unit into position for continuing the toasting operation.

Another advantage of the invention is the simplicity of its design and construction and the ease in which it is operated, thus it would appear that it may be manufactured so that the selling price thereof would not exceed that of the ordinary types now in use.

With the foregoing in mind, it will become readily apparent during the course of the following detailed description that the invention possesses further advantages, also illustrated throughout the accompanying drawing, and more fully pointed out in the appended claim.

With reference to the drawing:

Figure 1 is a side elevation assembly of the complete toaster; and Figure 2 is a front elevation thereof.

Figure 3 is a top plan view of the complete toaster.

Figure 4 is a front elevation of the toaster with the heating element unit removed.

Figure 5 is a vertical section taken upon line V—V of Figure 1.

Figure 6 is a side elevation of the heating element unit.

Figure 7 is an enlarged section taken upon line VII—VII of Figure 2.

Figure 8 is an enlarged sectional view showing how the arms of the heating element units engage the principal frame member.

The invention comprises principal frame member having base 1 each corner of which is formed legs 1A as indicated. Mounted upon base 1 and secured thereto in any approved manner is a metallic casing having back 2, top 3, and framed side openings 4, said openings are for the accommodation of doors 5, and said doors are pivoted to the frame member as at 6 respectively. Knobs 5A are provided for doors 5 and where shown, and a suitable spring may be employed but not shown, for automatically closing said doors if preferred.

As previously referred to as the outstanding feature of this invention, the removable heating element unit comprises base 7 with leg 7A formed at each end thereof, and referring to Figure 5 it follows that base 1 is provided with longitudinally disposed channel 1B so that base 7 may slidably engage said channel.

The bread supporting portion of the heating element unit has bottom rail 8 which is permanently fixed with base 7, and rising obliquely from said rail is a plurality of bars 9 upon each side thereof and terminating to top rail 10 as shown.

Vertically disposed plate 11 being composed of any suitable refractory material is provided and is rigidly secured to bottom rail 8 and top rail 10 by clips 12 where indicated.

Plate 11 is adapted to support high resistance wire 13 the strands of which are drawn around notches 11A within plate 11 so as to keep said wire separated and which is thereby the heating element, and referring at this time to Figure 6 it follows that metallic front 14 is provided and is permanently fixed with base 7 and top rail 10. Wires 15 from an electric circuit connected with heating element 13 as shown. It is also noted that pull 14A is secured to front 14 for obvious reasons.

The entire heating element unit shown in Figure 6 is removably inserted within the principal frame member with base 7 engaging channel 1B, which serves as a guide for said element, and in Figure 4 it is seen that socket 2A is secured to back 2 so as to receive end 7B as indicated in Figure 8.

The heating element unit is securely locked in position after being inserted in the frame member by providing threaded apertures 16 where shown in Figure 4 and with unthreaded apertures being provided in front 14 so as to align with apertures 16 and with the use of knurled screws 17 (Figure 7) this fact is effectively accomplished.

It is now understood that bread crumbs and the like accumulating upon the floor of base 1 may be completely removed by releasing front 14 from the frame member by virtue of screws 17, and the heating element unit quickly placed in position so as to restore the device for repeat operation.

It is also understood that bread is inserted into the device through doors 5 and when toasted likewise removed through the same.

In conclusion it may be added that the disclosure presented herewith is merely illustrative of the general principle sought to be protected by Letters Patent, and any modification made during a probable further development of the invention for the market, would fall consistently within the scope of the claim.

Having thus fully described my invention, what I claim as new is:

In an electric toaster, a casing open at one end and at opposite sides, bread holders constituting doors for closing the open sides of said casing and pivoted at their lower ends, and a removable heater housed in said casing and insertable and removable through its open end, said heater consisting of a frame having upper and lower members each formed with side and end bars and an intermediate bar carried by its end bars, side rails extending between the upper and lower members and secured at their ends to the side bars thereof, supports extending downwardly from the lower member for resting upon the bottom of said casing, a plate of insulation in said frame, clips carried by the insulation plate and engaged about the intermediate bars to mount the plate vertically between the upper and lower members, a plate at the outer end of said frame constituting a closure for the open end of the casing, removable fasteners for the closure plate, a terminal carried by said closure plate, and a resistance wound about the insulation plate and with its ends extending to said terminal.

ELZEAR J. RICARD.